350-311 SR
1/28/86 XR 4,567,122

United States Patent [19]
Baldry et al.
[11] Patent Number: 4,567,122
[45] Date of Patent: Jan. 28, 1986

[54] PHOTOTROPIC MATERIALS

[75] Inventors: Peter J. Baldry, Surrey; John H. Collins, Essex; Daniel J. Morantz, Kent; Terence K. W. Overton; David W. Wright, both of Essex, all of England

[73] Assignee: The Secretary of State for Defence in Her Majesty's Government of the United Kingdom of Great Britain and Northern Ireland, England

[21] Appl. No.: 456,283

[22] Filed: Jan. 6, 1983

[30] Foreign Application Priority Data

Jan. 15, 1982 [GB] United Kingdom ................. 8201127

[51] Int. Cl.[4] .............................................. C09K 15/00

[52] U.S. Cl. .......................................... 430/4; 2/426; 2/432; 350/311; 350/353; 351/163; 428/913; 430/607; 430/608

[58] Field of Search ............... 428/913; 430/4, 5, 607, 430/608; 2/426, 432; 350/311, 353, 354; 351/163

[56] References Cited

U.S. PATENT DOCUMENTS

T861,038 4/1969 Newland et al. ............... 350/354 X
3,285,746 11/1966 Marks et al. .................... 350/354 X
3,322,542 5/1967 Fisher et al. .................... 350/354 X

FOREIGN PATENT DOCUMENTS 1008536 10/1965 United Kingdom ................ 350/354

*Primary Examiner*—John E. Kittle
*Attorney, Agent, or Firm*—Stevens, Davis, Miller & Mosher

[57] ABSTRACT

An irreversible phototropic material consists of a plasticized matrix in which is suspended a phototropic transition metal salt and an additive which inhibits the production of haze in the phototropic material. Generally the additive is a substance which inhibits the reduction of the transition metal in the transition metal salt from a higher to a lower oxidation level. Suitable substances include chelating agents such as oxalic acid, ethylenediamine and EDTA, and oxidizing agents, such as chromium trioxide. The transition metal salt is preferably copper (II) chloride or a mixture of copper (II) chloride and bromide, while the matrix is preferably polyvinyl chloride or polyvinyl chloride/polyvinylidene chloride copolymer.

These phototropic materials may be used in protective devices, such as goggles and windows, to protect objects or subjects against intense radiation.

13 Claims, 1 Drawing Figure

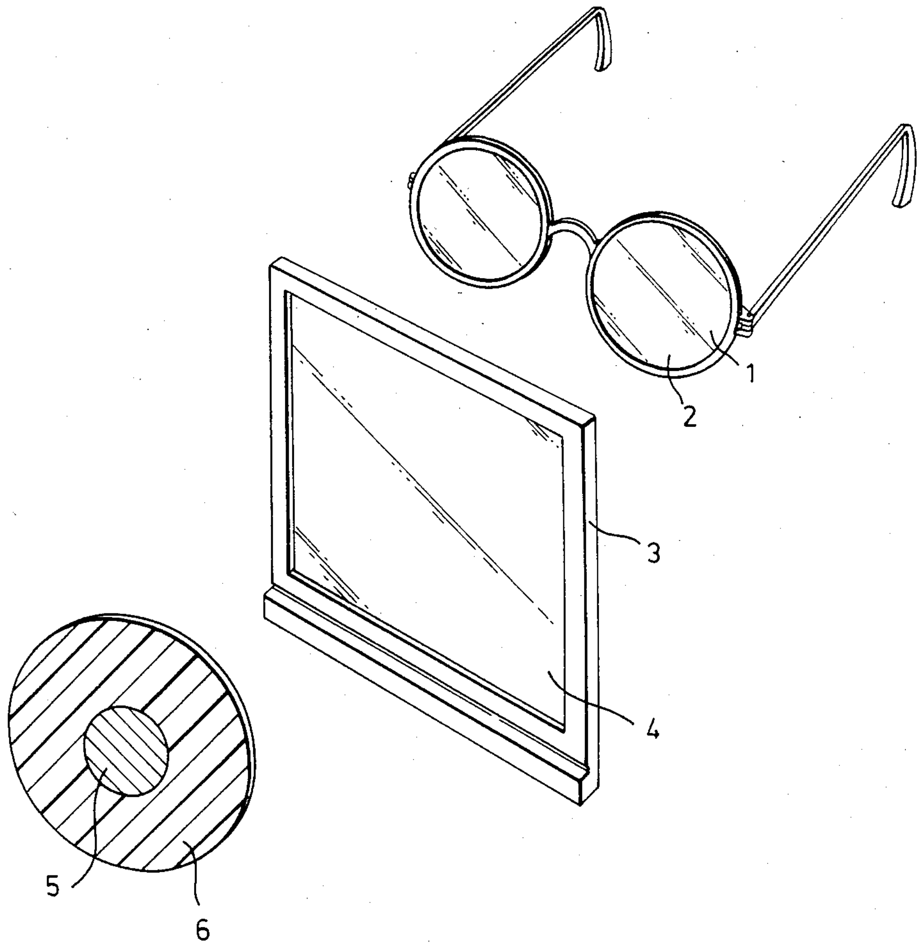
1
2
3
4
5
6

PHOTOTROPIC MATERIALS

The present invention relates to phototropic materials and, in particular, to phototropic materials which are substantially transparent and which, on exposure to radiation become irreversibly opaque.

The term phototropic material as used in this specification refers to materials which change in opacity in response to changes in intensity of radiation and in consequence the amount of radiation transmitted by these materials varies directly with the intensity of the incident radiation.

Total doses of radiation in excess of about 3 cal $cm^{-2}$ (which can be delivered in times ranging from a fraction of a second up to several seconds) can cause skin burns and, more seriously, eye damage. Devices to protect against such damage need to prevent radiation, in particular light radiation, from reaching the skin or eyes.

Such devices, in the form of personal equipment (eg goggles) or permanent fixtures (eg windows), are generally prepared from phototropic materials which, in normal circumstances, are transparent but which, on exposure to damaging levels of radiation, become opaque. In a preferred device of this type, radiation in the visible region of the electromagnetic spectrum, that is radiation of wavelength about 400 nm to about 800 nm, is transmitted prior to exposure. However, alternatively or additionally, the material may transmit radiation from other parts of the spectrum, for example the ultra violet and infra-red regions.

The degree of opaqueness that must be achieved by a device of the above type will be determined by the level of radiation exposure that is to be experienced. In the present specification a material is said to be opaque if it reduces the transmittal of incident radiation to a level below that which is considered dangerous to human or animal subjects (about 3 cal $cm^{-2}$ exposure).

Various phototropic materials have previously been used in devices of the above type. Of these materials, those which are rendered opaque on light exposure but which lose their opaqueness (become transparent) after a period of time are often favoured. It is a disadvantage of many of these materials, however, that in order to achieve an adequate transient optical density, they must be manufactured to a thickness of several millimeters. As a result, devices incorporating such reusable materials are often expensive to produce.

As a result, these reversible phototropic materials are now often replaced in protective devices by irreversible photochromic materials prepared from relatively cheap substances such as transition metal halides or nitrates. (Irreversible phototropic materials are materials which darken upon the application of radiation and will not thereafter become transparent). The low cost of these alternative materials compensating (in an economic sense) for their irreversible reaction to intense radiation.

Apart from their limited lifetime many of these irreversible phototropic materials have now been found to have the added disadvantage of being unstable under ambient conditions. This instability manifests itself particularly in the formation of haze which reduces the radiation transmission of the material to low levels. This in turn leads to the material becoming less and less transparent to radiation and to a greater and greater restriction on the vision of the protected subject under normal radiation conditions.

It is the primary object of the present invention to provide an irreversible phototropic material in which the amount of haze formed under ambient conditions is substantially reduced. It is a further object of this invention to provide protective devices incorporating these improved materials. Further objects of the present invention will become apparent from the following detailed description thereof.

According to the present invention there is provided an irreversible phototropic material comprising a matrix in which is suspended one or more phototropic transition metal salts and an additive wherein the additive is one or more substances which inhibit the production of haze in the phototropic material.

In the present specification "the production of haze" refers to the formation of light scattering and possibly other centres leading to a reduction of radiation transmission (particularly of visible radiation) in the phototropic material.

Suitable phototropic transition metal salts for use in the present invention contain a transition metal ion and a counter-ion. The metal ion is preferably chosen from the following group, Co(II), Ni(II), Fe(III), Zn(II) and especially Cu(II), whilst the counter ion is preferably chosen from the following group, halide, especially chloride and bromide, and nitrate.

Preferred haze inhibitors include substances which complex with transition metal ions, for example chelating agents such as oxalic acid, ethylenediamine and EDTA, and substances which are capable of oxidising a transition metal from a lower to a higher oxidation level, for example copper (II) nitrate, ceric ammonium sulphate and, which is preferred, chromium trioxide.

It appears that the preferred additives inhibit the formation of haze, in part at least, by inhibiting the reduction of the transition metal from a higher to a lower oxidation level. It follows that substances, in addition to those listed above, which inhibit this reduction may be used as an additive in the material of the present invention.

In a particularly preferred embodiment of the phototropic materials of the present invention the one or more metal salts are Cu(II) halides, especially a mixture of $CuCl_2$ and $CuBr_2$, whilst the additive is chromium trioxide.

Any of the polymeric matrices that have been used previously in the formation of irreversible phototropic materials may be employed as a matrix for the present materials. These include polyvinyl alcohol, vinyl acetate/vinyl alcohol copolymer or preferably, polyvinyl chloride (PVC) and vinyl chloride/vinylidene chloride copolymer. Other suitable matrices will, however, be immediately apparent to a man skilled in the phototropic material art.

In addition to the one or more metal salts and haze inhibitors the matrix may also contain a plasticiser, such as glycerol, diethylene glycol or tritolyl phosphate, to increase the plastic nature of the material, and a light sensitivity accelerator, such as p-benzoquinone or phosphoric acid, to increase the light sensitivity of the material.

Generally, the phototropic materials of the present invention will, prior to treatment with an intense level of radiation, be transparent to radiation in the visible region of the electromagnetic spectrum, that is of wavelength from about 400 nm to 800 nm. The precise region of transparency is not crucial, in some cases the material may absorb radiation from certain parts of the visible region and as a consequence be coloured.

The ratio of substances in the phototropic material of this invention will be determined primarily by the desired thickness of the sample and the level of radiation that is to be experienced. Typically the material will contain between 0.1 and 10% (w/w) of the one or more transition metal salts, between 0.01 and 1% (w/w) of the additive and between 90 and 99% (w/w) of the matrix. Optionally the material may also contain up to 20% or even higher percentages (w/w) of the plasticiser. In this latter case the material will contain between 70 and 99%, or even lower percentages (w/w) of the matrix.

The thickness of the present material will depend on the type of device into which the material is to be incorporated. The eyepiece of a pair of goggles generally requiring a thinner piece of material than a window. Typically the material will be between about 0.1 and 2 mm, preferably 0.5 and 1 mm thick. In a particularly preferred embodiment of the materials of this invention a sheet of PVC, 0.5 mm thick and containing about 1% of copper (II) chloride provided adequate protection (for a human subject) towards intense pulses of light amounting to 2–30 cal $cm^{-2}$ during an exposure time of 0.1 to 10 sec.

In a further aspect of the present invention there is provided a process for the production of an irreversible phototropic material according to the present invention comprising dissolving one or more phototropic transition metal salts, one or more substances which inhibit the production of haze in the phototropic material and one or more matrix materials in a solvent to form a solution, casting the solution onto a support and evaporating the solvent.

Optionally, a plasticiser and/or a light sensitivity accelerator may also be dissolved in the solvent prior to casting.

The transition metal salts, haze inhibitors, polymeric matrix materials, plasticisers and accelerators that are preferred for use in the process of the present invention will be the same as those listed above as preferred in the compositions making up the irreversible phototropic materials of this invention.

Any solvent that dissolves the combination of a phototropic transition metal salt, a haze inhibitor, a polymeric matrix material and, preferably, also a plasticiser and/or a light sensitivity accelerator, and that can be evaporated to yield the desired product, may be used in the present process. Preferably, however, the solvent will contain tetrahydrofuran, most preferably in admixture with up to 50% (v/v) of a volatile ketone, especially acetone or butanone.

In an alternative aspect of the present invention there is provided a process for the production of an irreversible phototropic material according to the present invention comprising premixing one or more phototropic transition metal salts, one or more substances which inhibit the production of haze in the phototropic material and one or more matrix materials, milling the mixture to form a crepe and pressing the crepe to form a film. Typically the crepe is converted to the film by a combination of heat and pressure treatment.

In a still further aspect of the present invention there is provided a shaped article which is adapted to protect an object or a subject against intense levels of radiation comprising a protective sheet, film or coating of an irreversible phototropic material according to the present invention.

Generally the shaped article will take the form of either personal equipment (eg an eyepiece for spectacles or goggles) or permanent fixtures (eg windows). However it may also take the form of a radiation monitor, to warn a subject of high levels of radiation, especially UV or visible, or of a coating for heat or light sensitive materials, such as electronic circuitry.

In the case of personal equipment or permanent fixtures the irreversible phototropic material will form the viewing zone of the article. In this case a film of the material (thickness 0.1 to 2 mm)may be retained in a suitable frame. Alternatively, a coating of the material on a transparent base support may be retained in such a frame.

The materials, processes and shaped articles of the present invention will now be described by way of example only, and with reference to the FIGURE in which FIG. 1 is a perspective view of pair of spectacles/goggles in which the eyepieces are manufactured from the present phototropic material, a perspective view of a window in which the viewing zone is manufactured from the present phototropic material, and a cross-sectional view of an electronic device having a protective coating of the present phototropic material.

EXAMPLE 1

Powdered copolymer of polyvinyl chloride and polyvinylidene chloride (22 g) and tritolyl phosphate (TTP, 1.54 g) were dissolved in a mixed solvent of 90% (v/v) tetrahydrofuran (stabilised with a small amount of 2,6-di-t-butyl-p-cresol) and 10% (v/v) butanone (total volume, 100 ml). Copper (II) chloride (0.55 g) and chromium trioxide (0.032 g) were then added to the solution and the whole was stirred for 3 to 4 hr. After the solution had been allowed to stand for 18 to 24 hrs it was decanted, to remove undissolved additives, and poured onto an optically smooth casting plate. The solution was levelled to the desired thickness (in this case, 3 mm) by a doctor blade and then treated with a stream of dry air (6 liter $min^{-1}$) to evaporate the solvent. Finally, when the lower surface of the film was dry enough to handle it was removed from the casting plate.

EXAMPLE 2

The procedure of Example 1 was repeated except that the solvent used was tetrahydrofuran (100 ml).

EXAMPLE 3

The procedure of Example 1 was repeated except that the solution was prepared from the following ingredients:

| | |
|---|---|
| 100 ml | Tetrahydrofuran |
| 100 ml | Acetone |
| 36 g | Polyvinyl chloride |
| 0.45 g | Copper (II) chloride |
| 0.216 g | Copper (II) bromide |
| 0.072 g | Chromium trioxide |
| 2.52 g | Tritolyl phosphate |

EXAMPLE 4

The procedure of Example 1 was repeated except that the solution was prepared from the following ingredients:

| | |
|---|---|
| 90 ml | Tetrahydrofuran |
| 10 ml | Butanone |
| 22 g | Polyvinyl chloride |
| 0.265 g | Copper (II) chloride |
| 0.132 g | Copper (II) bromide |
| 0.022 g | Chromium trioxide |
| 1.54 g | Tritolyl phosphate |

EXAMPLE 5

The procedure of Example 1 was repeated except that the solution was prepared from the following ingredients:

| | |
|---|---|
| 100 ml | Tetrahydrofuran |
| 44 g | Polyvinyl chloride |
| 0.55 g | Copper (II) chloride |
| 0.264 g | Copper (II) bromide |
| 0.088 g | Chromium trioxide |
| 3.08 g | Tritolyl phosphate |

EXAMPLE 6

The procedure of Example 1 was repeated except that the solution was prepared from the following ingredients:

| | |
|---|---|
| 180 ml | Tetrahydrofuran |
| 20 ml | Butanone |
| 44 g | Polyvinyl chloride |
| 0.55 g | Copper (II) chloride |
| 0.264 g | Copper (II) bromide |
| 0.011 g | Chromium trioxide |
| 3.08 g | Tritolyl phosphate |

EXAMPLE 7

The procedure of Example 6 was repeated except that 0.022 g of chromium trioxide was used.

EXAMPLE 8

The procedure of Example 6 was repeated except that 0.044 g of chromium trioxide was used.

EXAMPLE 9

The procedure of Example 6 was repeated except that 0.088 g of chromium trioxide was used.

EXAMPLE 10

The procedure of Example 6 was repeated except that 0.176 g of chromium trioxide was used.

EXAMPLE 11

The procedure of Example 1 was repeated except that the solution was prepared from the following ingredients:

| | |
|---|---|
| 100 ml | Tetrahydrofuran |
| 100 ml | Acetone |
| 36 g | Polyvinyl chloride |
| 0.55 g | Copper (II) chloride |
| 0.264 g | Copper (II) bromide |
| 0.072 g | Chromium trioxide |
| 3.08 g | Tritolyl phosphate |

EXAMPLE 12

The procedure of Example 1 was repeated except that the solution was prepared from the following ingredients:

| | |
|---|---|
| 180 ml | Tetrahydrofuran |
| 20 ml | Butanone |
| 44 g | PVC |
| 1.10 g | Copper (II) chloride |
| 0.065 g | Chromium trioxide |
| 3.08 g | Tritolyl phosphate |

EXAMPLE 13

The procedure of Example 12 was repeated except that 0.129 g of chromium trioxide was used.

EXAMPLE 14

Powdered polyvinyl chloride (44 g) and tritolyl phosphate (3.08 g) were dissolved in tetrahydrofuran (200 ml). When solution was complete the mixture was divided into two portions, and 1,2-ethylenediamine (0.132 g) was added to the first, whilst a mixture of copper (II) chloride (0.55 g) and copper (II) bromide (0.264 g) was added, with stirring, to the second. After the copper salts had dissolved the two solutions were allowed to stand overnight. They were then mixed, stirred for 1 hr, and again allowed to stand, in this case for 1 hr.

The solution was then poured onto an optically smooth casting plate. The solution was levelled to the desired thickness (in this case, 3 mm) by a doctor blade and then treated with a stream of dry air (6 liter $min^{-1}$) to evaporate the solvent. Finally, when the lower surface of the film was dry enough to handle it was removed from the casting plate.

EXAMPLE 15 (Comparative)

The procedure of Example 5 was repeated except that no chromium trioxide was added to the solution.

EXAMPLE 16 (Comparative)

The procedure of Example 6 was repeated except that no chromium trioxide was added to the solution.

EXAMPLE 17 (Comparative)

The procedure of Example 11 was repeated except that no chromium trioxide was added to the solution.

EXAMPLE 18 (Comparative)

The procedure of Example 12 was repeated except that no chromium trioxide was added to the solution.

EXAMPLE 19 (Comparative)

The procedure of Example 3 was repeated except that no chromium trioxide was added to the solution.

EXAMPLE 20

The procedure of Example 5 was repeated except that 0.198 g oxalic acid replaced the chromium trioxide.

EXAMPLE 21

The procedure of Example 3 was repeated except that 0.162 g oxalic acid replaced the chromium trioxide.

EXAMPLE 22

The procedure of Example 21 was repeated except that the weights of the components were as follows:

| | |
|---|---|
| 32 g | PVC |
| 0.40 g | Copper (II) chloride |
| 0.192 g | Copper (II) bromide |
| 0.144 g | Oxalic acid |

EXAMPLE 23

The procedure of Example 14 was repeated except that 0.321 g EDTA replaced the 1,2-ethylenediamine.

EXAMPLE 24

Powdered PVC (50 g), tritolyl phosphate (20 parts per hundred PVC (phr)), copper (II) chloride (1.25 phr), copper (II) bromide (0.60 phr) and chromium trioxide (0.30 phr) were pre-mixed and then milled for 4½–5 min on a two-roll mill at 105° (front) and 100° (rear roller). The crepe from milling was pressed on a 20 thou former, heated at 150°, first for 2 min at ambient pressure and second for 2½ min at a pressure of 500 psi, and finally cooled to ambient temperature over a period of 20 min at a pressure of 500 psi.

(a) Haze Production

The formation of haze in phototropic materials prepared by the above processes was studied as a function of time under the following conditions:

i. heating at 39° in a thermostatically controlled oven, and ii. heating at 48° in a beaker surrounded by a thermostatically controlled water bath.

iii. at room temperature (15°).

In all cases, films were wrapped in paper and kept in the dark. Haze was measured using a Diffusion Systems spherical hazemeter (set to BS2782 and ASTM D1003-59T). The results are given in Table 2.

(b) Haze Production

The formation of haze in phototropic materials prepared by the above processes was also studied as a function of time under the following conditions:

iv. irradiation of the film, mounted in an aluminium frame, for 5 min at 10 cm with a MED 250 W mercury arc lamp through an OX1 filter. The intensity of light of wavelength 350–400 nm was measured as 2.0 $mWcm^{-2}$. Results are given in Table 3.

(c) Flash Testing

Materials 5, 9 and 10 were exposed to 20 cal $cm^{-2}$ on a carbon arc. No damage resulted to the skin simulant samples with any of these films, and all films became opaque and some what charred on the surface facing the arc. Some thicker films (0.8–1.0 mm) were undamaged and quite clear on the other surface.

TABLE 1

| Example | Solvent | Matrix | Metal Salt(s) | Inhibitor | Plasticiser |
|---|---|---|---|---|---|
| 1 | 9:1,T-B(100 ml) | PVC-PVDC(22 g) | $CuCl_2$(0.55 g) | $CrO_3$(0.032 g) | TTP(1.54 g) |
| 2 | T(100 ml) | " | " | " | " |
| 3 | 1:1,T-A(200 ml) | PVC(36 g) | $CuCl_2$(0.45 g)<br>$CuBr_2$(0.216 g) | $CrO_3$(0.072 g) | TTP(2.52 g) |
| 4 | 9:1,T-B(100 ml) | PVC(22 g) | $CuCl_2$(0.265 g)<br>$CuBr_2$(0.132 g) | $CrO_3$(0.022 g) | TTP(1.54 g) |
| 5 | T(200 ml) | PVC(44 g) | $CuCl_2$(0.55 g)<br>$CuBr_2$(0.264 g) | $CrO_3$(0.088 g) | TTP(3.08 g) |
| 6 | 9:1,T-B(200 ml) | " | $CuCl_2$(0.55 g)<br>$CuBr_2$(0.264 g) | $CrO_3$(0.011 g) | " |
| 7 | " | " | $CuCl_2$(0.55 g)<br>$CuBr_2$(0.264 g) | $CrO_3$(0.022 g) | " |
| 8 | " | " | $CuCl_2$(0.55 g)<br>$CuBr_2$(0.264 g) | $CrO_3$(0.044 g) | " |
| 9 | " | " | $CuCl_2$(0.55 g)<br>$CuBr_2$(0.264 g) | $CrO_3$(0.088 g) | " |
| 10 | " | " | $CuCl_2$(0.55 g)<br>$CuBr_2$(0.264 g) | $CrO_3$(0.176 g) | " |
| 11 | 1:1,T-A(200 ml) | PVC(36 g) | $CuCl_2$(0.55 g)<br>$CuBr_2$(0.264 g) | $CrO_3$(0.072 g) | " |
| 12 | 9:1,T-B(200 ml) | PVC(44 g) | $CuCl_2$(1.10 g) | $CrO_3$(0.065 g) | " |
| 13 | " | " | " | $CrO_3$(0.129 g) | " |
| 14 | T(200 ml) | PVC(44 g) | $CuCl_2$(0.55 g)<br>$CuBr_2$(0.264 g) | 1,2-Ethylenediamine(0.132 g) | TTP(3.08 g) |
| 15 | " | " | $CuCl_2$(0.55 g)<br>$CuBr_2$(0.264 g) | — | " |
| 16 | 9:1,T-B(200 ml) | " | $CuCl_2$(0.55 g)<br>$CuBr_2$(0.264 g) | — | " |
| 17 | 1:1,T-A(200 ml) | PVC(36 g) | $CuCl_2$(0.55 g)<br>$CuBr_2$(0.264 g) | — | " |
| 18 | 9:1,T-B(200 ml) | PVC(44 g) | $CuCl_2$(1.10 g) | — | " |
| 19 | 1:1,T-A(200 ml) | PVC(36 g) | $CuCl_2$(0.45 g)<br>$CuBr_2$(0.216 g) | — | TTP(2.52 g) |
| 20 | T(200 ml) | PVC(44 g) | $CuCl_2$(0.55 g)<br>$CuBr_2$(0.264 g) | Oxalicacid(0.198 g) | TTP(3.08 g) |
| 21 | 1:1,T-A(200 ml) | PVC(36 g) | $CuCl_2$(0.45 g)<br>$CuBr_2$(0.216 g) | Oxalicacid(0.162 g) | TTP(2.52 g) |
| 22 | 1;1,T-A(200 ml) | PVC(32 g) | $CuCl_2$(0.40 g)<br>$CuBr_2$(0.192 g) | Oxalicacid(0.144 g) | TTP(2.52 g) |
| 23 | T(200 ml) | PVC(44 g) | $CuCl_2$(0.55 g)<br>$CuBr_2$(0.264 g) | EDTA(0.321 g) | TTP(3.08 g) |

Note:
T = Tetrahydrofuran
B = Butanone
A = Acetone

TABLE 2

| Example | Film Material | Temperature (°C.) | Time (hr) | % Haze Development |
|---|---|---|---|---|
| A | 16 (Comparative) | 48 | 0 | 2.4 ± 0.3 |
| | | | 115 | 77.1 ± 0.9 |
| | | | 180 | 93.4 ± 1.8 |
| | | | 690 | ca. 100 |
| | 9 | 48 | 0 | 3.3 ± 0.7 |
| | | | 115 | 5.3 ± 0.7 |
| | | | 180 | 5.5 ± 0.6 |
| | | | 690 | 30.5 ± 7.8 |
| B | 16 (Comparative) | 39 | 0 | 2.6 ± 0.9 |
| | | | 100 | 48.6 ± 9.3 |
| | | | 150 | 88.1 ± 3.5 |
| | | | 720 | ca. 100 |
| | | | 1975 | ca. 100 |
| | 8 | 39 | 0 | 2.1 ± 0.1 |
| | | | 100 | 3.4 ± 0.3 |
| | | | 150 | 4.3 ± 0.8 |
| | | | 720 | 29.0 ± 15.6 |
| | | | 1975 | 57.9 ± 13.7 |
| | 9 | 39 | 0 | 2.9 ± 0.1 |
| | | | 100 | 4.3 ± 0.4 |
| | | | 150 | 4.3 ± 0.5 |
| | | | 720 | 4.6 ± 0.2 |
| | | | 1975 | 6.8 ± 2.3 |
| C | 15 | 15 | 0 | 4.8 ± 3.2 |
| | | | 11.5 months | 20.1 ± 7.9 |
| | | 0 | 0 | 1.8 ± 0.4 |
| | | | 11.5 months | 3.1 ± 0.3 |

TABLE 3

| Film Material | % Haze Development 0 min | 5 min | % Transmission after Irradiation |
|---|---|---|---|
| 15 | 2.8 | 36.8 | 66 |
| 19 | 2.4 | 27.8 | 93 |
| 20 | 6.1 | 13.2 | 80 |
| 14 | 51.9 | 55.5 | 83 |
| 23 | 19.2 | 71.5 | 56 |
| 5 | 2.8 | 9.8 | 81 |

Note: % Transmission after irradiation refers to the transmission of visible light after 5 min. irradiation as a % of original transmission. (Measured on a hazemeter; uncertainty approx ± 9%).

Articles manufactured from the present phototropic material

Referring to the FIGURE, it illustrates a pair of spectacles/goggles (1) in which the eyepieces (2) are manufactured from the present phototropic material, especially a material prepared according to Example 5 or 9 above. Also illustrated is a window (3) in which the viewing zone (4) is manufactured from the present phototropic material, especially a material prepared according to Example 5 or 9 above. Finally, it illustrates an electronic device (5) having a coating (6) manufactured from the present phototropic material, especially a material prepared according to Example 5 or 9 above.

What we claim is:

1. An irreversible phototropic material comprising a matrix of a polymeric material selected from the group consisting of polyvinyl chloride and the copolymer of vinyl chloride and vinylidene chloride in which is suspended a phototropic transition metal salt and an additive wherein the additive comprises a substance which inhibits the reduction of the transition metal in the transition metal salt from a higher to a lower oxidation level and thereby inhibits the production of haze in the phototropic material.

2. An irreversible phototropic material according to claim 1 wherein the additive comprises a chelating agent for the transition metal of the transition metal salt.

3. An irreversible phototropic material according to claim 2 wherein the chelating agent is selected from the group consisting of oxalic acid, ethylenediamine and EDTA.

4. An irreversible phototropic material according to claim 1 wherein the additive comprises a substance which is capable of oxidizing the transition metal in the transition metal salt from a lower to a higher oxidation level.

5. An irreversible phototropic material according to claim 4 wherein the additive is selected from the group consisting of chromium trioxide, copper (II) nitrate and ceric ammonium sulphate.

6. An irreversible phototropic material according to claim 1 wherein the transition metal salt is selected from the group consisting of copper (II) halide, copper (II) nitrate, cobalt (II) halide, cobalt (II) nitrate, nickel (II) halide, Nickel (II) nitrate, iron (III) halide, Iron (III) nitrate, zinc (II) halide, zinc (II) nitrate.

7. An irreversible phototropic material according to claim 6 wherein the halide ion is selected from the group consisting of chloride and bromide.

8. An irreversible phototropic material according to claim 1 further comprising, in suspension in the matrix, a plasiticiser selected from the group consisting of glycerol, diethylene glycol and tritolyl phosphate.

9. An irreversible phototropic material according to claim 1 further comprising, in suspension in the matrix, a light sensitivity accelerator selected from the group consisting of p-benzoquinone and phosphoric acid.

10. An irreversible phototropic material according to claim 1 wherein the material contains between 90 and 99% (w/w) of the matrix, between 0.1 and 10% (w/w) of the transition metal salt and between 0.01 and 1% (w/w) of the additive.

11. An irreversible phototropic material according to claim 8 wherein the material contains between 70 and 99% (w/w) of the matrix, between 0.1 and 10% (w/w) of the transition metal salt, between 0.01 and 1% (w/w) of the additive and up to 20% (w/w) of the plasticiser.

12. An article of manufacture which is adapted to protect an object or a subject against intense levels of radiation comprising a protective sheet, film or coating of an irreversible phototropic material according to claim 1.

13. An article of manufacture according to claim 12 which is in the form of an eyepiece for spectacles or goggles, a window, a radiation monitor or a coating for electronic circuitry.

* * * * *